United States Patent [19]

Grove

[11] Patent Number: 4,792,799
[45] Date of Patent: Dec. 20, 1988

[54] AIRCRAFT TERRAIN CLOSURE WARNING SYSTEM WITH DESCENT RATE BASED ENVELOPE MODIFICATION

[75] Inventor: Michael M. Grove, Kirkland, Wash.

[73] Assignee: Sundstrand Data Control, Inc., Redmond, Wash.

[21] Appl. No.: 62,368

[22] Filed: Jun. 12, 1987

Related U.S. Application Data

[63] Continuation of Ser. No. 704,365, Feb. 22, 1985, abandoned.

[51] Int. Cl.$^4$ .............................................. G08B 23/00
[52] U.S. Cl. .................................. 340/970; 73/178 R; 340/963; 364/433
[58] Field of Search ............... 340/963, 964, 970, 977; 364/427, 433, 428; 73/178 R, 178 T; 244/180; 342/65, 120

[56] References Cited

U.S. PATENT DOCUMENTS

| | | | |
|---|---|---|---|
| 3,715,718 | 2/1973 | Astengo | 340/964 |
| 3,934,221 | 1/1976 | Bateman et al. | 340/970 |
| 3,934,222 | 1/1976 | Bateman et al. | 340/970 |
| 3,944,968 | 3/1976 | Bateman et al. | 340/970 |
| 3,946,358 | 3/1976 | Bateman | 340/970 |
| 3,958,218 | 5/1976 | Bateman | 73/178 R |
| 3,958,219 | 5/1976 | Bateman et al. | 340/970 |
| 4,016,565 | 4/1977 | Walker | 364/433 |
| 4,060,793 | 11/1977 | Bateman | 340/964 |
| 4,215,334 | 7/1980 | Bateman | 340/970 |
| 4,495,483 | 1/1985 | Bateman | 73/178 T |
| 4,551,723 | 11/1985 | Paterson | 340/963 |
| 4,567,483 | 1/1986 | Bateman et al. | 340/970 |
| 4,639,730 | 1/1987 | Paterson et al. | 340/970 |

FOREIGN PATENT DOCUMENTS 2139589A 11/1984 United Kingdom ............... 340/970

Primary Examiner—Donnie L. Crosland
Assistant Examiner—Brent A. Swarthout
Attorney, Agent, or Firm—Mason, Kolehmainen, Rathburn & Wyss

[57] ABSTRACT

A ground proximity warning system especially adapted for a tactical aircraft provides the pilot with a warning in the event that the closure rate is excessive for the altitude above ground at which the aircraft is flying. The descent rate of the aircraft is monitored and used to bias the closure rate warning signal to reduce nuisance warnings when the excessive closure rate is part of an intentional maneuver such as a dive during a tactical mission.

26 Claims, 2 Drawing Sheets

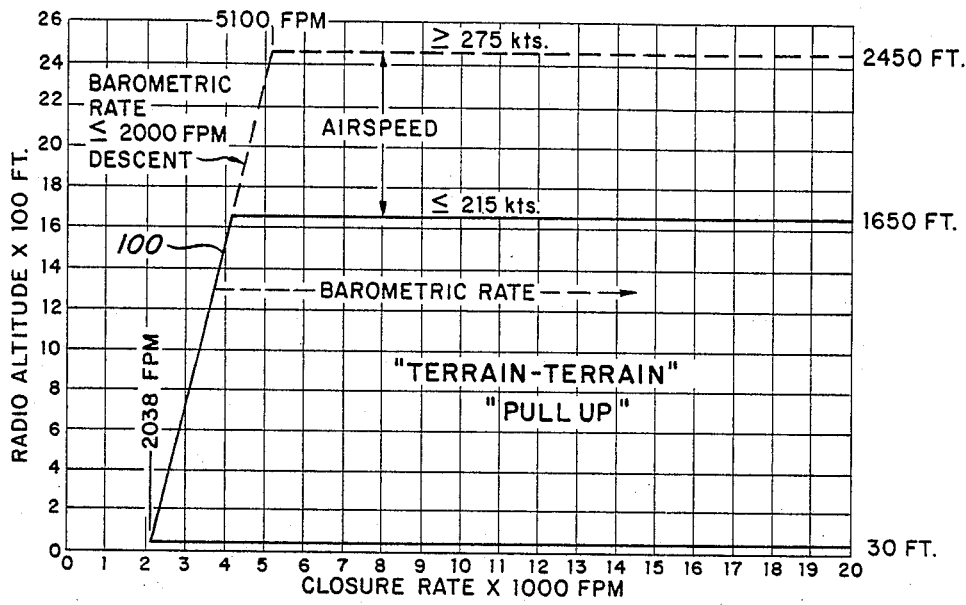

Fig. 2

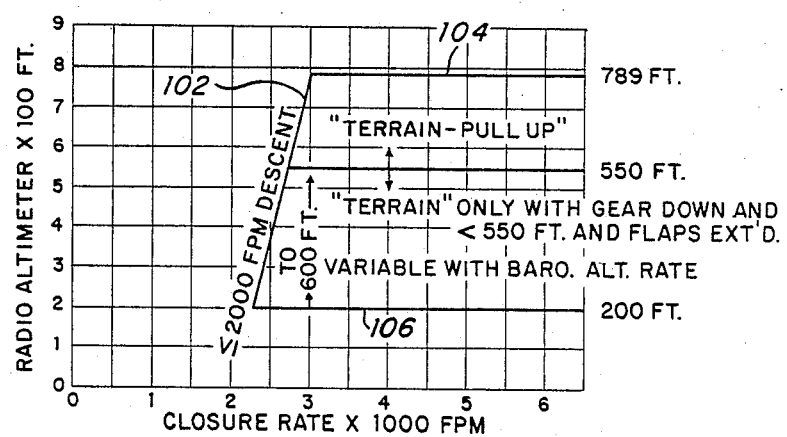

| RATE LIMITS (FPM) | | | COMPLEMENTARY FILTER CONSTANT | |
|---|---|---|---|---|
| CONDITION | A | B | CONDITION | $T_2$ |
| (1) FU · > 30 FT. $\overline{WOW}$ · ≤ 214 kts | 2000 | 4090 ●● | (1) $GU_L$ · ≤ 214 kts. | 3.0 s ● |
| (2) FU · > 30 FT. $\overline{WOW}$ · ≥ 275 kts. | 2000 | 5100 ●● | (2) $GU_L^-$ ≥ 275 kts. | 1.5 s ● |
| (3) FD · > 200 FT. + MS | 910 | 3000 | (3) $GD_L^-$ ≤ 214 kts. | 5.0 s |
| (4) FD · (< 200 FT. + WOW) | -590 | 1500 | (4) $GD_L^-$ · (FD + < 30 FT. + WOW + MS) | 10.0 s |
| | | | (5) $GU_L^-$ MS | 4.3 s |

●● UPPER LIMIT (B) VARIES WITH AIRSPEED BETWEEN 214 kts. (4090 FPM) AND 275 kts. (5100 FPM)

● $T_2$ VARIES WITH AIRSPEED BETWEEN 214 kts. (3.0 s.) AND 275 kts. (1.5 s.)

$$B = \frac{AIRSPEED - 214 \text{ kts.}}{61 \text{ kts.}} \cdot (1010 \text{ FPM}) + 4090 \text{ FPM}$$

$$T_2 = 3.0 \text{ s.} - \frac{(AIRSPEED - 214 \text{ kts.})}{61 \text{ kts.}} (1.5 \text{ s.})$$

AIRCRAFT TERRAIN CLOSURE WARNING SYSTEM WITH DESCENT RATE BASED ENVELOPE MODIFICATION

This application is a continuation of appliation Ser. No. 704,365, filed Feb. 22, 1985, now abandoned.

BACKGROUND OF THE INVENTION

1. Field of the Invention

This invention relates generally to ground proximity warning systems for aircraft, and more particularly to systems that monitor the altitude above ground and the closure rate of the aircraft to determine a hazardous flight condition. Even more particularly, the present invention relates to a system that warns the pilot of excessive terrain closure wherein the warning criteria are modified as a function of the descent rate of the aircraft to prevent warnings from being generated when the closure rate is the result of an intentional high descent rate such as that encountered during a dive or other abrupt maneuver.

2. Description of the Prior Art

Ground proximity warning systems that warn of a dangerous flight condition are known. Examples of such systems are disclosed in U.S. Pat. Nos. 3,934,221; 3,934,222; 3,944,968; 3,946,358 3,958,218 and 3,958,219 assigned to the assignee of the present invention. All of these systems monitor the radio altitude and the radio altitude closure rate and generate a warning if the rate of closure is excessive for the altitude at which the aircraft is flying.

While these systems do provide a way to warn a pilot of a hazardous condition resulting from an excessive closure rate with terrain, these systems are designed for use in transport aircraft, and not for highly maneuverable, high performance tactical aircraft such as the Lockheed S3-A whose flight and operational characteristics are such that high descent rates are often encountered in normal operation. Such high descent rates can result in sufficiently high closure rates to cause systems designed for transport aircraft to generate false or nuisance warnings during certain normal operational conditions of such an aircraft.

SUMMARY OF THE INVENTION

Accordingly, it is an object of the present invention to provide a ground proximity warning system that overcomes many of the disadvantages of the prior art warning systems when applied to maneuverable aircraft.

It is another object of the present invention to provide an excessive terrain closure warning system that is particularly suitable for use in maneuverable, high performance aircraft.

It is yet another object of the present invention to provide an excessive closure rate warning system wherein the criteria for generating an excessive closure rate warning are modified as a function of the descent rate of the aircraft.

The operational and flight conditions of a high performance aircraft, for example, tactical aircraft such as the Lockheed S3-A, are considerably different than those of transport aircraft. For example, it is quite common for such an aircraft to engage in maneuvers wherein high descent rates are encountered. Such high descent rates can result in sufficiently high closure rates to cause an excessive closure rate warning to be generated when such a warning is inappropriate. It is possible to prevent such nuisance warnings from being generated by altering the warning criteria such that the closure rates resulting from such normally encountered descent rates are insufficient to cause a warning to be generated. However, such an approach will cause the terrain closure warning system to become less sensitive and reduce the warning time provided under conditions where the terrain closure rate is, in fact, excessive.

Therefore, in accordance with a preferred embodiment of the invention, there is provided a system that monitors the descent rate of the aircraft as well as the closure rate, and modifies the warning criteria necessary to generate an excessive closure rate warning as a function of descent rate in order to reduce the probability of generating a nuisance excessive terrain closure warning when the terrain closure is the result of a high descent rate that is part of an intentional maneuver. Furthermore, this system is implemented in such a way as to preserve terrain closure rate protection for flight path scenarios normally associated with controlled flight into terrain accidents.

DESCRIPTION OF THE DRAWING

These and other objects and advantages of the present invention will become readily apparent upon consideration of the following detailed description and attached drawing, wherein:

FIG. 2 is a graph illustrating the closure rates necessary to generate a warning when the aircraft is flying with its flaps retracted;

FIG. 3 is a graph illustrating the closure rates necessary to generate a warning when the aircraft is flying with its flaps extended or flying in a tactical mode of operation; and FIGS. 4 and 5 are tables illustrating how the limiter rate limits and filter time constants are established.

DETAILED DESCRIPTION OF THE PREFERRED EMBODIMENT

Figure 1:
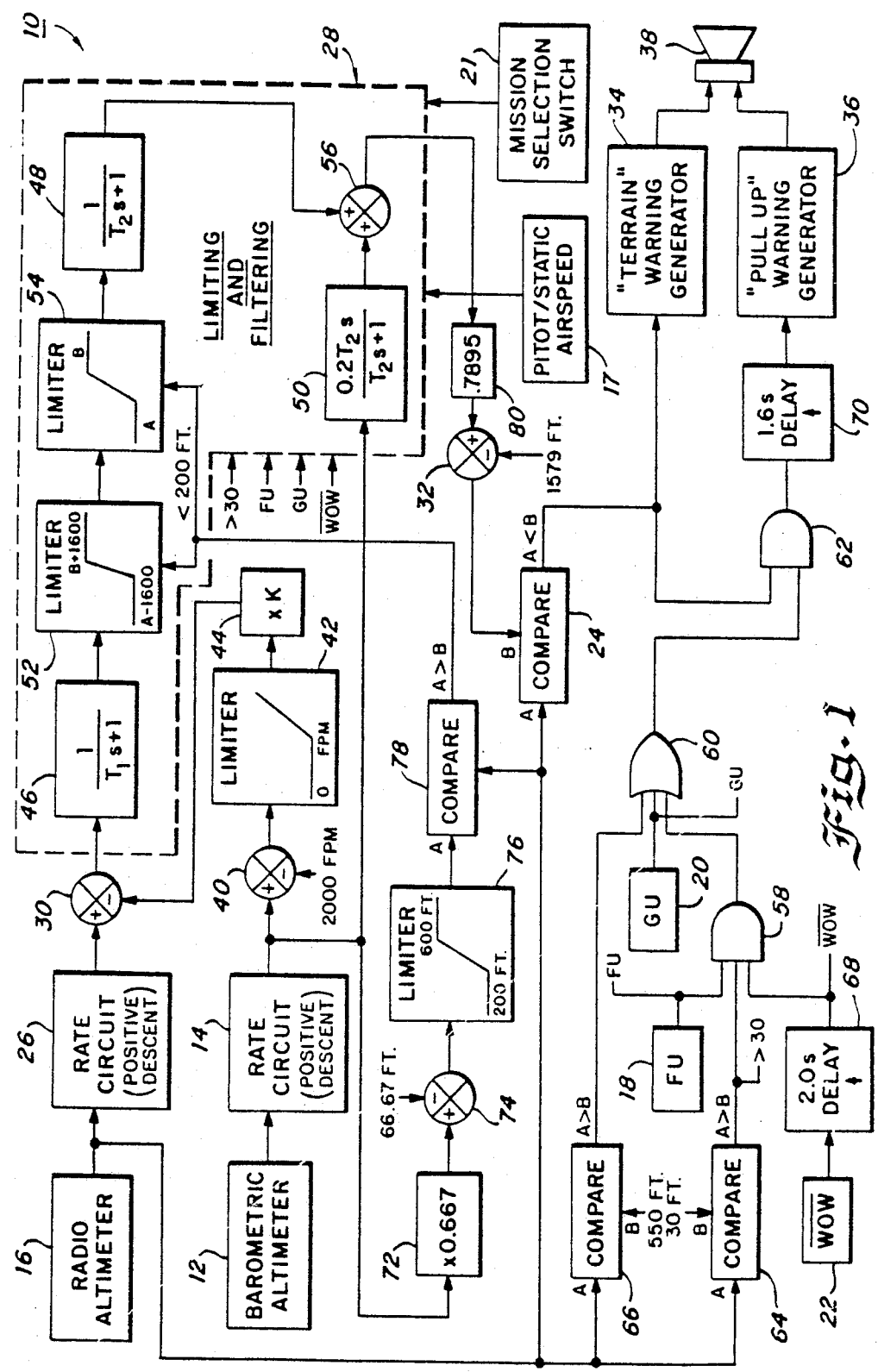
FIG. 1 is a logical block diagram of the warning system according to the invention.

Referring now to the drawing, with particular attention to FIG. 1, there is illustrated an embodiment of the excessive terrain closure warning system generally designated by the reference numeral 10. The system 10 according to the invention is illustrated in FIG. 1 in logial block diagram form as a series of gates, comparators, summing junctions, limiters, filters, scaling circuits and the like for purposes of illustration; however, it should be understood that the actual implementation of the logic can be other than as shown in FIG. 1, with various digital and analog implementations being possible. The signals used by the system as described include radio altitude, radio altitude rate and barometric altitude rate and airspeed along with signals representative of flap position, landing gear position, mission mode selection and whether there is weight on the wheels of the aircraft. Depending on the type of aircraft in which the warning system is installed, the signals for the system shown in FIG. 1 can be obtained from individual instruments, such as a barometric altimeter 12, a barometric rate circuit 14, a radio altimeter 16, a radio rate circuit 26, a pitot/static based airspeed 17 and discrete circuits indicative of flap position, landing gear position, mission mode selection and whether or not there is weight on the wheels. Such discretes include a flap up discrete 18, a gear up discrete 20, a mission selection switch 21 and a no weight on wheels discrete 22 in FIG. 1. Alternatively, the barometric altitude and rate signals can be obtained from an air data computer, or the Z-velocity signal from an inertial navigation system can be used in place of the barometric rate signal. Also, the signals can be obtained from a digital data bus in certain newer aircraft.

The system according to the invention compares the altitude above ground of the aircraft with the closure rate, preferably radio altitude rate, or a computed closure rate based on a combination of the radio altitude rate and the barometric altitude rate. If the closure rate is excessive for the altitude at which the aircraft is flying, a warning is generated. The determination of whether or not a warning is to be generated is made by a mode comparator 24 which compares the radio altitude signal from the radio altimeter 16 with a closure rate signal received from a rate circuit 26 via limiting and filtering circuitry 28 and a pair of summing junctions 30 and 32. The comparator 24 compares the closure rate signal and the radio altitude signal and causes a warning to be generated when the closure rate is excessive for the altitude at which the aircraft is flying. Preferably, the warning generated is an aural warning such as a "TERRAIN" warning generated by a terrain warning generator 34 or a "PULL UP" warning generated by a pull up warning generator 36 and applied either directly or indirectly to a transducer 38 which may be a loudspeaker or a set of headphones.

As previously discussed, the system according to the invention modifies the warning criteria required for a warning to be generated in order to compensate for closure rates resulting from high descent rates. The modification is accomplished by a summing junction 40, a limiter 42, a scalin circuit 44 and the summing junction 30 which serve to bias the radio rate signal from the rate circuit 26 to provide a biased closure rate signal that is applied to the limiting and filtering circuitry 28.

In the embodiment illustrated in the FIG. 1, the limiting and filtering circuit includes a pair of low pass filters 46 and 48, a high pass filter 50, a pair of limiters 52 and 54 and a summing junction 56. The filters 48 and 50 cooperate with a summing junction 56 to provide a complementary filter of the type disclosed in the previously mentioned patents. A series of gates 58, 60 and 62 as well as comparators 64 and 66 cooperate with the flap up, gear up and no weight on wheels discretes 18, 20 and 22, respectively, to enable the system only under certain conditions which will be discussed in a subsequent portion of the specification. A delay circuit 68 serves to reduce nuisance warnings that might occur immediately after take off (loss of WOW signal) due to barometric ground effects, and another delay circuit 70 delays the generation of the "PULL UP" warning until two repetitions of the "TERRAIN" warning have occurred. A scaling circuit 72, a summing junction 74, a limiter 76 and a comparator 78 serve to provide a less than 200 foot signal that is used to alter the limits of the limiters 52 and 54, and hence the warning criteria as a function of barometric rate in a conventional fashion.

In operation, the rate signal from the limiting and filtering circuit 28 is modified by scaling circuit 80 and summing junction 32. These functions serve to implement the slope and offset observed in the warning envelopes of FIGS. 2 and 3. The comparator 24 compares the signal from the summing junction 32 with the output of the radio altimeter 16 and causes either the warning generator 34 or the warning generator 36 to generate a warning whenever the closure rate is excessive for the altitude above ground at which the aircraft is flying.

As previously stated, the summing junction 40, the limiter 42 and the scaling circuit 44 serve to combine a signal representative of the descent rate of the aircraft with the signal from the rate circuit 26. Thus, the scaled descent rate from the scaling circuit 44 is subtracted from the output of the rate circuit 26 by the summing junction 30 in order to cancel out a portion of the closure rate signal prior to limiting and filtering. Also, the summing junction 40 serves to subtract a signal representative of a 2000 feet per minute descent rate from the output of the rate circuit 14 so that no biasing of the closure rate signal can occur unless the descent rate exceeds 2000 feet per minute. The limiter 42 permits signals representative of descent rates greater than 2000 feet per minute to be applied from the summing junction 40 to the scaling circuit 44 but limits any signals representative of descent rates less than 2000 feet per minute or ascent rates.

The modification to the warning criteria is illustrated in graphical form in FIG. 2. As is illustrated in FIG. 2 when the aircraft is flying with its flaps retracted, a warning is generated whenever the closure rate exceeds the rate defined by a line 100. If the speed of the aircraft is 214 knots or less, the warning is generated only between altitudes 30 feet and 1650 feet. With increasing airspeed, the upper altitude limit is increased until the warning may be generated at altitudes as high as 2450 feet at airspeeds in excess of 275 knots. Thus, the line 100 together with the upper and lower altitude limits define the warning criteria when the barometric descent rate is 2000 feet per minute or less.

The biased closure rate signal applied by the summing junction 30 to the limiting and filtering circuitry 28 can be defined by the equation:

$$BCR = CR - [K(DR - A\,fpm)]$$

wherein BCR is the biased closure rate, CR is the unmodified closure rate or radio rate, DR is the descent rate (barometric descent rate or Z-velocity) and K and A are constants. Because of the action of the limiting circuit 42, the term in brackets remains zero until the descent rate exceeds 2000 feet per minute. Thus, the value for A in the equation for the biased closure rate in the illustrated embodiment would be 2000 feet per minute. Consequently, the warning criteria are defined by the line 100 for descent rates of less than 2000 feet per minute. However, at higher descent rates, the warning boundary is effectively shifted to the right as a function of descent rate. The amount that the boundary is shifted at a particular descent rate, depends on whether the landing gear of the aircraft is up or down. With the landing gear down, the scaling factor K is selected to be 0.75. With the landing gear up, greater descent rates may be tolerated, and the scaling factor K is increased to 1.5, shifting the warning boundary more to the right.

FIG. 3 illustrates the criteria required for a warning to be generated when the aircraft is flying with its flaps extended or when the aircraft is flying in a tactical mode, such as, for example, in a low level reconnaissance mode or in an attack mode. A tactical mode of operation is indicated to the system when the pilot actuates a mission select switch in the cockpit of the aircraft.

The warning envelope illustrated in FIG. 3 illustrates the warning criteria when the descent rate of the aircraft is less than 2000 feet per minute. In such an event, the left hand warning boundary is defined by a line 102. The upper warning boundary is defined by a line 104 at 789 feet of radio altitude and the lower warning boundary is defined by a line 106. The warning boundary 106 is movable as a function of barometric descent rate and is selected to be 200 feet of radio altitude at descent rates less than 400 feet per minute. For greater descent rates, the lower boundary 106 is raised until it reaches 600 feet of radio altitude for descent rates of 1000 feet per minute and more. Two distinct warnings are given. Above 550 feet of radio altitude the warning is "TERRAIN-PULL UP". Below 550 feet of radio altitude, the warning is simply "TERRAIN" if the landing gear is down and the flaps are extended. Otherwise the entire "TERRAIN-PULL UP" message is generated. As in the case of the envelope illustrated in FIG. 2, the warning boundary 102 is shifted to the right as a function of descent rate, with the shifting function being the same as the function described in conjunction with FIG. 2.

As previously stated, the shapes of the warning criteria are altered as a function of airspeed and landing gear and flap position. Such alteration is accomplished by altering the rate limits of the rate limiters 52 and 54 and the time constants $T_1$ and $T_2$ of the filters 46, 48 and 50 (FIG. 1). The time constant $T_1$, as sampled at the output of the filter 46, is varied as a function of closure rate. If the rate is between the limits A and B of the limiter 54, the time constant $T_1$ is set to 0.1 second. If the rate is outside of the limits A and B, the time constant is increased to 3.0 seconds. This rate limiting and filtering results in effectively "sticking" the closure at the limit values for short periods of time, thereby providing better nuisance warning margins for erratic radio altitude signals.

The conditions for setting the rate limits A and B are illustrated in FIG. 4. If the flaps are up and the aircraft is above 30 feet of radio altitude, and there is no weight on the wheels and if the aircraft is flying at less than 214 knots with mission select not active, A is set to 2000 feet per minute and B is set to 4090 feet per minute as is indicated by relation (1). At 275 knots or greater, the rate limit B is set to 5100 feet per minute as is indicated by relation (2). Between airspeeds of 214 knots and 275 knots, the rate limit B is increased linearly as defined by the equation defining the rate limit B in FIG. 4. The relations (1) and (2) correspond to the airspeed expansion above 214 knots illustrated in FIG. 2. The rate limits A and B required to produce the warning envelope of FIG. 3 are illustrated by relations (3) and (4) of FIG. 4. If the aircraft is flying above 200 feet of radio altitude and the flaps are down or the mission select switch has been activated, the rate limits A and B are 910 and 3000 feet per minute, respectively. With the flaps down and if the aircraft is either flying below 200 feet or there is weight on the wheels, the rate limits are set at 590 and 1500 feet per minute, respectively, to inhibit all functions.

Similarly, the time constant $T_2$ is also adjusted as a function of airspeed, altitude, flap position, weight on wheels and whether a mission has been selected as is illustrated in FIG. 4. The gear up latched ($GU_L$) and gear down latched ($GD_L$) signals are logic signals that are available from a conventional ground proximity warning system. The time constant is adjusted to higher values as the probability of momentary excursions into the envelopes or FIGS. 2 and 3 increases, thereby providing additional margin against nuisance warnings. Such excursions are more likely when the aircraft is in landing configuration on final approach or in a mission select mode.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A ground proximity warning system for a tactical aircraft comprising:
    means responsive to a signal representative of the altitude of the aircraft above ground and to a signal representative of the terrain closure rate of the aircraft for generating a closure rate warning when the terrain closure rate is excessive according to a predetermined relationship for the altitude at which the aircraft is flying;
    means responsive to the descent rate of the aircraft for providing a signal representative of the descent rate of the aircraft; and
    means responsive to said descent rate signal for reducing the possibility of nuisance closure rate warnings by altering said predetermined relationship as a function of the descent rate to increase the closure rate at which a warning is given as the descent rate increases.

2. A ground proximity warning system as recited in claim 1 wherein said predetermiined relationship is altered to make the terrain closure rate warning generating means less responsive to closure rate when the aircraft is descending.

3. A ground proximity warning system as recited in claim 2 wherein said altering means includes means for altering said predetermined relationship as a first function of descent rate when the landing gear of the aircraft is retracted and as a second function of descent rate when the landing gear is extended.

4. A ground proximity warning system as recited in claim 3 wherein said first function is operative to alter said predetermined relationship at a greater rate than said second function.

5. A ground proximity warning system as recited in claim 2 wherein said predetermined relationship is altered when the descent rate exceeds a predetermined descent rate.

6. A ground proximity warning system as recited in claim 5 wherein said predetermined descent rate is approximately 2000 feed per minute.

7. A ground proximity warning system as recited in claim 1 wherein said means for reducing the possibility of nuisance closure rate warnings alters said predetermined relationship only when the descent rate of the aircraft exceeds a predetermined rate.

8. A ground proximity warning system as recited in claim 7 wherein said predetermined descent rate is approximately 2000 feet per minute.

9. A ground proximityy warning system as recited in claim 1 wherein said means for reducing the possibility of generating nuisance warnings includes;
    means for subtracting at least a portion of said descent rate representative signal from said terrain closure rate representative signal to provide a biased closure rate signal; and
    means responsive to a signal representative of the altitude of the aircraft above ground and to said subtracting means for generating a warning if the biased terrain closure rate of the aircraft is excessive for the altitude at which the aircraft is flying.

10. A ground proximity warning system as recited in claim 9 wherein said subtracting means is responsive to said descent rate representative signal only when the aircraft is descending.

11. A ground proximity warning system as recited in claim 10 wherein said subtracting means is responsive to said descent rate representative signal only when the descent rate of the aircraft exceeds a predetermined rate.

12. A ground proximity warning system as recited in claim 11 wherein said predetermined descent rate is approximately 2000 feet per minute.

13. A ground proximity warning system as recited in claim 9 wherein the biased closure rate signal is defined by the following equation:

$$BCR = CR - [K(DR - A\ fpm)]$$

wherein BCR is the biased closure rate, CR is the unmodified closure rate, DR is the descent rate and K and A are predetermined constants.

14. A ground proximity warning system as recited in claim 13 wherein K is 0.75 to 1.5.

15. A ground proximity warning system as recited in claim 14 further including means for providing a signal representative of the position of the landing gear of the aircraft for altering the value of K from 1.5 when the landing gear is up to 0.75 when the landing gear is down.

16. A ground proximity warning system as recited in claim 13 wherein A is 2000.

17. A ground proximity warning system as recited in claim 1 wherein said means for reducing the possibility of generating a nuisance closure rate warning includes means responsive to the descent rate of the aircraft for biasing the closure rate signal as a function of descent rate so that a higher closure rate is required to generate the warning when the aircraft is descending.

18. The improvement recited in claim 17 wherein said biasing means is operative to bias the closure rate signal only when the aircraft is descending.

19. The improvement recited in claim 18 wherein said biasing mean is operative to bias the closure rate signal only when the descent rate of the aircraft equals or exceeds a predetermined rate.

20. The improvement recited in claim 19 wherein said predetermined descent rate is approximately 2000 feet per minute.

21. The improvement recited in claim 17 further including means responsive to the position of the landing gear for rendering said biasing means operative to bias the closure rate signal to a greater degree when the landing gear is up than when the landing gear is down.

22. The improvement recited in claim 17 wherein the biased closure rate signal is defined by the following equation:

$$BCR = CR - [K(DR - A\ fpm)]$$

wherein BCR is the biased closure rate, CR is the unmodified closure rate, DR is the descent rate and K and A are predetermined constants.

23. The improvement recited in claim 22 wherein K is on the order of 0.75 to 1.5.

24. The improvement recited in claim 23 further including means for providing a signal representative of the position of the landing gear of the aircraft for altering the value of K from 1.5 when the landing gear is up to 0.75 when the landing gear is down.

25. A ground proximity warning system as recited in claim 26 wherein A is 2000.

26. A ground proximity warning system for a tactical aircraft comprising:
means for receiving altitude signals representative of the altitude of the aircraft above ground;
means for receiving a descent rate signal representative of the descent rate of the aircraft;
means for providing a terrain closure rate signal representative of the terrain closure rate of the aircraft;
means responsive to the altitude signal receiving means and to the terrain closure rate signal providing means for generating a warning if the terrain closure rate is excessive according to a predetermined relationship for the altitude at which the aircraft is flying;
means responsive to said descent rate signal receiving means for reducing the possibility of generating nuisance warnings by altering said predetermined relationship as a predetermined function of the descent rate of the aircraft, wherein said predetermined relationship is altered to make the terrain closure rate generating means less responsive to closure rate when the aircraft is descending; and wherein said means for reducing the possibility of generating nuisance warnings includes means for altering said predetermined relationship as a first function of the descent rate when landing gear of the aircraft is retracted and as a second function of the descent rate when a landing gear of the aircraft is retracted and as a second function of the descent rate when the landing gear is extended and wherein said first function is operative to alter said peedetermined relationship at a greater rate than said second function.

* * * * *